United States Patent Office 3,516,815
Patented June 23, 1970

3,516,815
SEED GERMINATION ENHANCEMENT
Emil P. Lira, Des Plaines, and Arthur H. Freytag, Mundelein, Ill., assignors to International Minerals & Chemical Corporation, a corporation of New York
No Drawing. Filed Apr. 20, 1967, Ser. No. 632,186
Int. Cl. A01n 21/02
U.S. Cl. 71—77      14 Claims

ABSTRACT OF THE DISCLOSURE

The emergence of seedlings from sown seeds, especially seeds subjected to adverse environmental (e.g., temperature and moisture) conditions, is enhanced by contacting the seeds, during the germination thereof, with benzoyl peroxide, halogenated benzoyl peroxides, t-butyl perbenzoate, or p-methane hydroperoxide. The enhancers of this invention are most conveniently applied to the seeds before sowing. In instances where the seeds are treated before sowing, maximum enhancement is generally obtained when the seeds are slightly coated with a suitable sticker, such as a surface active agent or lanolin, before the application of the enhancers of this invention.

BACKGROUND OF THE INVENTION

This invention relates to a method of increasing the emergence of seedlings from planted seeds. Effective compositions and methods for enhancing the germination of sown seeds are highly desirable. It is often advantageous to plant seeds in relatively cool soils and, therefore, the most favorable conditions for the germination of the seeds are not present. For example, the value of many crops vary as the earliness with which the crops are placed on the market. However, seed rot sometimes occurs in cold soils and this necessitates costly re-seeding. Seed germination enhancers would allow the sowing of seeds earlier than normal in the spring so as to length the growing season and permit the crops to be harvested and placed on the market at the earliest possible time. Effective seed germination enhancers would also offer protection of sown seeds against adverse changes in environment, e.g., soil temperature and moisture levels, when the seeds are sown under normal conditions. Germination enhancers would also possibly enlarge the agricultural productivity areas of the world, at least with respect to some crops, by allowing crops to be grown in area which are colder than those where they are normally grown. Rapid germination would also usually decrease seed loss caused by soil-born organisms, such as bacteria and fungi, since a vigorously germinating seed is more resistant to such attack than a slower germinating seed.

Many compositions have been found to be useful for improving the germination of seeds and/or the emergence of seedlings. Such compositions include various chemicals which are toxic to soil-born microorganisms and, accordingly, are used to treat seeds before planting so as to reduce the adverse effect of soil-born organisms on the seeds. Various peroxides have been disclosed as being useful in treatments for seeds. For example, U.S. Pat. No. 1,927,988 discloses that an extended treatment of seeds with hydrogen peroxide, solid peroxides or persolids (such as magnesium peroxide, calcium peroxide and barium peroxide), and solid organic percompounds before the sowing of the seeds results in the seeds being vitalized and strengthened, and that the development of the sown seeds takes place as quickly as possible for given conditions of soil. The length of the treatment may vary from 12 to 24 hours when hydrogen peroxide solutions or suspensions of solid treatment materials in water are used to at least some weeks when dry materials are used. The germination of seeds is accelerated in accordance with the process disclosed in U.S. Pat. No. 2,006,967 by contacting the seeds in the presence of water with hydrogen peroxide, persalts (e.g., perborate and persulfate), inorganic peroxides (e.g., barium peroxide and zinc peroxide), and organic peroxides (e.g., urea peroxide) until the seeds have begun to germinate. It has also been proposed to use "an oxygen-generating substance," i.e., an oxidizing agent, such as benzoyl peroxide in conjunction with formaldehyde when it is used to disinfect seeds before planting. However, in this case the oxidizing agent is not actually utilized to treat the seeds, but it is employed to oxidize the formaldehyde so that no detrimental effect occurs from its use.

SUMMARY OF THE INVENTION

In accordance with this invention, it has been found that the emergence of seedlings from planted seeds is enhanced by contacting the seeds during the germination thereof with benzoyl peroxide in a quantity to increase the emergence of seedlings from the planted seeds but insufficient to adversely affect the seeds or seedlings, i.e., exhibit phytotoxicity. For the purpose of describing this invention, the term "germination" is used in the specification and the claims in accordance with the common, but not exactly technically accurate, meaning of incuding the processes of seed germination and emergence of the resulting seedlings through the soil surface. Although the enhancers of this invention are effective in increasing the emergence of seedlings from sown seeds, it is not known whether the effect of the enhancers is exhibited during only one or both of these processes.

Compounds other than benzoyl peroxide which have been found to be similarly useful include halogenated benzoyl peroxides, e.g., chlorinated benzoyl peroxides such as 2,4-dichlorobenzoyl peroxide and 4-chlorobenzoyl peroxide, t-butyl perbenzoate, and p-methane hydroperoxide. The enhancers of this invention are preferably applied to the seeds before they are sown, but may be applied to the seeds while they are in the soil.

The emergence of seedlings resulting from seeds treated with an enhancer of this invention before sowing is generally even further enhanced by applying a light coating of a suitable sticker before the applictaion of the enhancer. The method of this invention is especially useful when the treated seeds are subjected, during the process of germination and emergence of seedlings, to adverse environmental conditions which would normally be detrimental to untreated seeds.

The effectiveness of benzoyl peroxide is unexpected in view of various publications on the agronomic effects of benzoyl peroxide and related organic peroxides. Although U.S. Pat. No. 1,927,988 discloses that seeds are vitalized by being treated with a solid organic percompound for a protracted period of time, benzoyl peroxide is not among the compounds coming within the definition of percompounds in the patent. The patent defines the percompounds as including true peroxides which react with acids to give off hydrogen peroxide. Benzoyl peroxide (and the other enhancers of this invention) do not come within this definition since the addition of benzoyl peroxide to an aqueous solution of a mineral acid would first result in the hydrolysis of the benzoyl peroxide to perbenzoic acid and benzoic acid. The perbenzoic acid, in turn, reacts with the mineral acid to produce benzoic acid and hydrogen peroxide. It is, therefore, the perbenzoic acid which is the percompound according to the definition of the patent. Furthermore, the patent discloses that it is necessary to treat the seeds for extended periods, whereas there is a substantial increase in the number of emerging seedlings in accordance with the instant invention by merely applying the enhancers of this invention to the seeds shortly before, or even after, the sowing. It will be noted in the subsequent examples that there is only a slight increase in emerging seedlings from seeds treated with hydrogen peroxide and various organic and inorganic peroxides, as compared to when benzoyl peroxide and the other enhancers of this invention are used.

As hereinbefore discussed, U.S. Pat. No. 2,006,967 discloses that the germination of seeds may be accelerated by contacting the seeds with an organic peroxide such as urea peroxide in the presence of water until the seeds have begun to germinate. Peroxides of the urea peroxide type are not true covalent organic peroxides, but are water-soluble complexes which have the property of gradually releasing hydrogen peroxide. It is reported by Siegel (Physiol. Plant., 15, 21, 1962) that organic hydroperoxides have an inhibitory effect on the germination of turnip and lettuce seeds when the seeds were germinated in buffered solutions of the hydroperoxides. It has also been reported (Gowing and Leeper, Bot. Gaz. 121, 249–257, 1960) that benzoyl peroxide is without effect with respect to the induction or inhibition of flowering in pineapples. In fact, benzoyl peroxide would appear to have a detrimental effect on the emergence of seedlings from the disclosure of U.S. Pat. No. 2,657,125, which is directed to the use of organic peroxides as herbicides.

While the reasons for the beneficial effect of benzoyl peroxide (as well as the other enhancer) on the emergence of seedlings from sown seeds is not fully understood, it is believed that benzoyl peroxide acts more than as a fungicide. The fungicidal activity exhibited by benzoyl peroxide is only a small fraction of that exhibited by tetramethylthiuram disulfide (Klopping and van der Kirk, Recueil, 70, 927–930, 1951), which is a fungicide sold under the brand name of Thiram. However, it will be noted in Example II that benzoyl peroxide compares very favorably with tetramthylthiuram disulfide used in recommended amounts to treat seeds. Furthermore, evidence indicating that benzoyl peroxide functions at least partly as a growth regulator has been noted.

DESCRIPTION OF THE PREFERRED EMBODIMENTS

Although the method of the present invention is effective in enhancing the emergence of seedlings from seeds of a variety of plants, it is especially applicable to rice seeds and seeds having a fat (oil) content of at least about 15% by weight (e.g., cotton, soybean, sunflower and peanut seeds). The method of this invention is also applicable to other types of seeds, as for example, corn seeds.

The solid enhancers of this invention (benzoyl peroxide and halogenated benzoyl peroxides) are conveniently applied to the seeds in solid (dust) formulations. The solid formulations can consist entirely of benzoyl peroxide or one of the halogenated benzoyl peroxides or they may include additives, such as fungicides and insecticides. The solids can be applied directly to the seeds by tumbling a weighted amount thereof with the seeds until the seeds are uniformly and evenly coated.

In instances where the solid enhancers of this invention are applied to the seeds before sowing, the seeds are preferably initially treated with a suitable "sticker" such as lanolin or a surface active agent until the seeds are uniformly and lightly coated with the same. Lanolin and some surface active agents by themselves will have some enhancing effect, but the combination of the enhancers and the lanolin or surface active agent has been found to be synergistic.

The liquid enhancers, i.e., p-methane hydroperoxide and t-butyl perbenzoate, in a weighted amount may be similarly tumbled with the seeds until they are evenly coated. In addition, the seeds may be merely soaked in some p-methane hydroperoxide or t-butyl perbenzoate. In either embodiment, the liquid enhancers may be in admixture with a surfactant. Alternatively, the seeds may be lightly coated with a sticker such as lanolin or a surface active agent before the application of the liquid enhancers.

Other methods of treating the seeds in accordance with the method of this invention will be apparent to those skilled in the art. For example, the solid benzoyl peroxide may also be applied to the seeds in the form of a paste or slurry. The slurry seed treatment composition is prepared by adding a benzoyl peroxide to a liquid in which the benzoyl peroxide being used is substantially insoluble. Suitable liquids for preparing benzoyl peroxide slurries include water and organic liquids such as petroleum ether, ethylene glycol, glycerol, mineral oil, amyl alcohol and ethyl alcohol. If desired, surface active agents and other additives such as fungicides can also be added to the slurry. The slurry is then applied to the seeds by conventional techniques, such as by using a conventional slurry treater or by tumbling the slurry onto the seeds. Still other methods of applying the enhancers include planting the seeds in a band or pocket in the soil to which an enhancer, e.g., benzoyl peroxide, has been separately added, before, during or after the planting.

The materials which are preferred as stickers in the method are lanolin and surface active agents. A considerable number and variety of surface active agents may be used and include pure compounds, mixtures of compounds of the same classes, or mixtures of compounds of different classes. The useful surface active agents are cationic surface active agents, anionic surface active agents, non-ionic surface active agents, and various blends thereof such as blends of anionic and non-ionic surface active agents. Typical satisfactory surface active agents are soaps (e.g., sodium laurate and diethanol-ammonium oleate), alkali metal higher alkylarylsulfonates (e.g., sodium dodecylbenzenesulfonate and the sodium salts of alkylnaphthalenesulfonic acids), fatty alcohol sulfates (e.g., sodium salts of monoesters of sulfuric acid with n-aliphatic alcohols containing 8–18 carbon atoms), sodium salts of petroleum-derived alkylsulfonic acids, polyoxyethylene sorbitan fatty acid esters (e.g., polyoxyethylene sorbitan monooleate), alkylarylpolyether alcohols, partial esters of polyhydric alcohols with long chain monocarboxyic acids (e.g., glycerol monostearate), quaternary ammonium salts in which one of the groups attached to the nitrogen has an aliphatic group of at least 8 carbon atoms (e.g., trimethyl cetyl ammonium iodide and lauryl pyridinium chloride), and amines, amides, diamines and glyoxalidines having an aliphatic group containing at least 8 carbon atoms and their acid esters (e.g., stearylamine hydrochloride). Other materials which may be used as stickers include heavy mineral, vegetable and fish oils, low volatile glycols, wool fat, wool wax, and the like.

The benzoyl peroxide (or one of the other enhancers of this invention) is applied to the seeds in an amount sufficient to enhance the emergence of the seedlings, but insufficient to adversely affect the seeds or seedlings. In general, application rates of from about 0.01 to about 5 pounds, preferably from about 0.5 to about 2 pounds, per 100 pounds of seeds are effective in embodiments where a solid or liquid enhancer is applied to the seeds before sowing by tumbling. However, greater or lesser rates of application will also be useful, depending upon the particular seeds, method of application and environmental conditions encountered in the soil. In instances where the seeds are coated with a sticker prior to the application of an enhancer, the sticker is used in an amount sufficient to apply a uniform light coat to the seeds and assure the adherence of the treating chemical. This will generally range from about 0.1 to about 2 pounds per 100 pounds of seeds of the sticker.

The following examples will illustrate the effectiveness of the method of this invention in enhancing the germination of seeds.

EXAMPLE I

This test, which was conducted in the field, demonstrates the improved emergence rates which are obtained by the method of this invention. This test compares the rate of emergence of untreated seeds, seeds treated with only lanolin or benzoyl peroxide, and seeds treated with benzoyl peroxide after the application of a light lanolin coating. The seeds used in this test were delinted cotton seeds of the Carolina Queen variety.

In this test (as well as in the tests described in the following examples) the seeds to be treated and a weighted amount of a treating chemical were placed in a jar. Solid treating chemicals are preferably applied in finely divided form, e.g., at least about 75% of —20 mesh (Tyler standard), while liquid treating chemicals were used as is. In instances where a sticker was used in combination with the treating agents, the seeds were initially lightly coated with the sticker (usually in the amount of about 1% by weight based on the seed) to assure adherence of the enhancer to the seeds. The jars were then placed in a mechanical roller and rolled for about one-half hour to obtain a uniform coating of the treating chemical on the seed.

Four replications of 100 seeds per treatment were planted in randomized row plots 25 feet long. At the time of this test the temperature of the soil was low and the moisture level of the soil was relatively high so that conditions conducive to seed decay and damping-off of the seedlings were present. The planted rows were observed and the deedlings emerging per row were recorded until seedlings had ceased to emerge, which was about 20 days after planting. The results of this test were calculated in terms of percent emergence (the percentage of seeds planted which resulted in the emergence of seedlings through the surface of the soil).

It was noted that only 27% of the untreated or control seeds emerged. Seeds treated with only lanolin and only benzoyl peroxide (in the amount of 1% based on the weight of the seeds) each had emergence rates of about 40%. The highest levels of emergence, i.e., about 49%, were obtained with the seeds treated with 1% by weight of benzoyl peroxide after an initial coating of lanolin. These test results clearly indicate the effectiveness of the method of this invention in enhancing the rate of emergence of seedlings from cotton seeds.

EXAMPLE II

This test was conducted under controlled conditions in a greenhouse to compare the rates of emergence of seedlings from untreated seeds with seeds treated in accordance with this invention (treated with varying amounts of benzoyl peroxide, t-butyl perbenzoate or p-menthane hydroperoxide in combination with various stickers) and seeds treated with hydrogen peroxide and with commercial fungicides sold as seed-treating compositions. Cotton seeds of the Carolina Queen variety were again used in this test.

The stickers and the treating chemicals were applied to the seeds as outlined in Example I except in Lot 28, where the seeds were treated with hydrogen peroxide by soaking them for 20 to 30 minutes in a 30% aqueous hydrogen peroxide solution which was in the amount of 3% of the seed weight.

The treated seeds were planted in a prepared soil in metal pans. The soil consisted of one-half sand, one-fourth peat and one-fourth field soil. The temperature of the soil in the pans was controlled by arranging the pans so that their lower 3 inches protruded into a water bath. The temperature of the water bath was automatically controlled to maintain the desired soil temperature. The water bath temperature control was preset in this test to maintain maximum soil temperatures of about 60° F. for 8 hours during the nights and temperatures of about 60° to 75° F. during the days, with about one to two hours being required for the transitions between the night temperatures and the day temperatures. Adequate moisture levels were maintained in the pans during the course of the test.

The pans were observed from the time that seedlings began to emerge through the surface of the soil until the time that seedlings ceased to emerge. The results of this test, in terms of percent emergence, are given in Table I:

TABLE I

Seed treatment

| Lot | Treating chemical Name | Percent by weight | Sticker | Percent emergence |
|---|---|---|---|---|
| 1 | Control | | None | 10.0 |
| 2 | Benzoyl peroxide | .1 | Lanolin | 36.8 |
| 3 | do | .5 | do | 70.0 |
| 4 | do | 1 | do | 56.7 |
| 5 | do | 1.5 | do | 70.0 |
| 6 | do | 2 | do | 50.0 |
| 7 | do | 2.5 | do | 56.7 |
| 8 | do | 3 | do | 60.0 |
| 9 | do | .1 | Anionic-nonionic surfactant blend.[1] | 36.8 |
| 10 | do | .5 | do | 73.4 |
| 11 | do | 1 | do | 33.3 |
| 12 | do | 1.5 | do | 63.3 |
| 13 | do | 2 | do | 60.0 |
| 14 | do | 2.5 | do | 63.3 |
| 15 | do | 3 | do | 66.7 |
| 16 | do | 1 | Dodecyl-di(aminoethyl)-glycine.[2] | 80.0 |
| 17 | do | 2 | do | 66.7 |
| 18 | do | 3 | do | 56.7 |
| 19 | do | 1 | Polyoxyethylene Sorbitan monolaurate.[3] | 53.3 |
| 20 | do | 1 | Dimethylaminopropyl-oleamide.[4] | 70.0 |
| 21 | do | 1 | Neutral alkylarylsulfonate.[5] | 76.7 |

See footnote at end of table.

TABLE I—Continued

| Lot | Treating chemical Name | Percent by Weight | Sticker | Percent emergence |
|---|---|---|---|---|
| 22 | p-Menthane hydroperoxide. | 1 | None | 63.3 |
| 23 | do | 1 | Anionic-nonionic surfactant blend.[1] | 30.0 |
| 24 | do | 2 | do | 53.3 |
| 25 | t-Butyl perbenzoate | 1 | None | 40.0 |
| 26 | do | 1 | Anionic-nonionic surfactant blend.[1] | 50.0 |
| 27 | do | 2 | do | 46.7 |
| 28 | 30% aqueous hydrogen peroxide. | 3 | None | 13.3 |
| 29 | do | 1 | do | 20.0 |
| 30 | Tetramethylthiuram disulfide.[6] | .3 | do | 56.7 |
| 31 | do | .5 | do | 53.3 |
| 32 | Green coat [7] | | do | 56.0 |

[1] Sold under name of Atlox 3409.
[2] An ampholytic surfactant sold under the name of Tego 51.
[3] A non-ionic surfactant sold under name of Tween 20.
[4] A cationic surfactant sold under name of Tegamine 0-13.
[5] An anionic surfactant sold under name of Mentor Beads HG as a 60% by weight paste in water.
[6] A commercial seed-treating fungicide sold under name of Thiram, with .3% by weight being recommended treatment rate.
[7] Commercially available seeds which have been treated with the following mixture of chemicals:

Name: Oz. per cwt.
(1) 1,4-dichloro-2, 5-dimethoxybenzene (65% active) _____ 10.00
(2) O,O-diethyl S-(2-(ethyltio) ethyl) phosphorodithiolate _____ 4.00
(3) Tetramethylthiuram disulfide (65% active) _____ 3.00
(4) 2-nitro-p-toluidine acetoacetanilide _____ 2.62
(5) N-trichloromethylmercapto-4-cyclohexene-1, 2-dicarboximide (75% active) _____ .50
(6) Pentachloronitrobenzene (75% active) _____ .50
(7) Polychloro copper phthalocyanine _____ .40
(8) Naphthyleneacetic acid _____ .05
(9) Indolebutyric acid _____ .05
(10) 2-methyl-1-naphthyleneacetic acid _____ .05
(11) 2-methyl-1-naphthyleneacetamide _____ .05

A review of the results of this test shows that the untreated or control seeds had an emergence rate of only 10% (Lot 1). Hydrogen peroxide, which is disclosed in U.S. Pat. No. 1,927,988 as being useful for vitalizing seeds, improved the emergence somewhat to 13.3 and 20% (Lots 28 and 29, respectively). The seeds treated with commercial fungicides in Lots 30 to 32 had emergence rates of 53.3 to 56.7%. It will be noted that the seeds treated in accordance with this invention (Lots 2 to 27) had emergence rates ranging up to 80%. Therefore, seeds treated by the method of this invention compared very favorably with, and in many instances exceeded, the emergence of seeds treated with the commercial products.

EXAMPLE III

The procedures outlined in Example II was repeated in this test which compared in rates of emergence of untreated cotton seeds (Carolina Queen variety) with seeds treated with 1% and 2% by weight of 4-chlorobenzoyl peroxide and 1% and 2% by weight of 2,4-dichlorobenzoyl peroxide. The results of this test were similar to those of Example II in that the treated seeds had higher emergence rates than the untreated seeds.

EXAMPLE IV

This test, which compares the emergence of seedlings from benzoyl peroxide-treated seeds with seeds treated with compounds related to the enhancers of this invention, e.g., other organic peroxides and inorganic peroxides, was conducted under substantially the same conditions as outlined in Example II except that the soil temperatures during the days reached from 70° to 80° F. Table II gives the results of this test, again in percent emergence.

TABLE II

| Lot | Treating chemical Name | Percent by weight | Sticker | Percent emergence |
|---|---|---|---|---|
| 33 | Control | | None | 4.0 |
| 34 | Benzoyl peroxide | 1 | do | 26.7 |
| 35 | do | 1 | Lanolin | 86.7 |
| 36 | do | 2 | do | 53.3 |
| 37 | do | 1 | Anionic-nonionic surfactant blend.[1] | 50.0 |
| 38 | do | 2 | do | 63.3 |
| 39 | Lauryl peroxide | 1 | do | 20.0 |
| 40 | do | 2 | do | 0 |
| 41 | Peracetic acid | 1 | None | 0 |
| 42 | Cumene peroxide | 1 | do | 10.0 |
| 43 | Dicumyl peroxide | 1 | do | 0 |
| 44 | 60% Methyl ethyl ketone peroxide. | | do | 6.67 |
| 45 | Benzoic acid | 1 | do | 20.0 |
| 46 | Sodium peroxide | 1 | do | 10.0 |
| 47 | Barium peroxide | 1 | do | 6.67 |

[1] Sold under name of Atlox 3409.

The effectiveness of benzoyl peroxide, as compared to related compounds, in enhancing the germination and/or emergence of sown seeds is readily noted from Table II. In this test the untreated or control seeds of Lot 33 had an emergence rate of only 4%. Seeds treated with 1% benzoyl peroxide without a sticker had an emergence rate of 26.7% (Lot 34), while seeds treated with benzoyl peroxide after an initial sticker coating had emergence rates ranging from 50.0% to 86.7%. However, seeds treated with the other compounds (Lots 39 to 47) had maximum emergence rates of only 20%.

EXAMPLE V

In this example the effect of benzoyl peroxide in enhancing the emergence of seedlings from rice seeds and relatively oily seeds is noted. The general procedure outlined in Example II was again followed and the rates of emergence of seedlings resulting from seeds treated in accordance with this invention were compared with seedlings resulting from untreated seeds. The treated seeds were prepared by applying a light coating of Atlox 3409 to them and then rolling them with 1% by weight of benzoyl peroxide. The results obtained are given in Table III:

TABLE III

| Lot | Seeds | Treatment | Percent emergence |
|---|---|---|---|
| 48 | Rice (Bluebonnet 50 variety). | Benzoyl peroxide and Atlox 3409. | 43.3 |
| 49 | do | None | 23.3 |
| 50 | Blackeye peas (California variety). | Benzoyl peroxide and Atlox 3409. | 13.3 |
| 51 | do | None | 0 |
| 52 | Sunflower (mammoth Russian variety). | Benzoyl peroxide and Atlox 3409. | 86.7 |
| 53 | do | None | 76.8 |
| 54 | Peanuts (runner type) | Benzoyl peroxide and Atlox 3409. | 66.7 |
| 55 | do | None | 36.7 |

Although this invention has been described in relation to specific embodiments, it will be apparent that obvious modifications may be made by one skilled in the art without departing from the intended scope threeof as defined by the appended claims:

We claim:

1. The method of increasing the number of seedlings emerging from seeds sown in soil which comprises contacting the seeds, during the germination thereof, with a germination-enhancing amount of a compound of the group consisting of benzoyl peroxide, a halogenated benzoyl peroxide, p-menthane hydroperoxide and t-butyl perbenzoate.

2. The method in accordance with claim 1 wherein said halogenated benzoyl peroxide is a chlorinated benzoyl peroxide.

3. The method in accordance with claim 2 wherein said compound is applied to said seeds in an amount of from about 0.01 to about 5 pounds per 100 pounds of seeds before said seeds are sown, and said seeds are subjected to adverse environmental conditions during the germination thereof.

4. The method in accordance with claim 3 wherein a sticker is applied to said seeds before the application of said compound, said sticker being applied in an amount to assure the adherence of said compound to said seed.

5. The method in accordance with claim 4 wherein said compound is applied in an amount of from about .5 to about 2 pounds per 100 pounds of seed.

6. The method in accordance with claim 5 wherein said sticker is lanolin or a surface active agent and it is applied to said seeds in an amount of from about 0.1 to about 2 pounds per 100 pounds of seeds.

7. The method in accordance with claim 5 wherein said compound is 4-chlorobenzoyl peroxide or 2,4-dichlorobenzoyl peroxide.

8. The method in accordance with claim 5 wherein said compound is benzoyl peroxide.

9. The method in accordance with claim 5 wherein said compound is p-menthane hydroperoxide.

10. The method in accordance with claim 5 wherein said compound is t-butyl perbenzoate.

11. The method in accordance with claim 5 wherein said seeds are cotton seeds.

12. The method in accordance with claim 8 wherein said benzoyl peroxide is applied in a finely divided form to said seeds.

13. The method in accordance with claim 5 wherein said seeds are rice seeds.

14. The method in accordance with claim 5 wherein said seeds have an oil content of at least 15% by weight.

References Cited

UNITED STATES PATENTS 1,927,988  9/1933  Muller _____ 71—65
1,962,996  6/1934  Muller _____ 71—65

JAMES O. THOMAS, Jr., Primary Examiner

UNITED STATES PATENT OFFICE
CERTIFICATE OF CORRECTION

Patent No. 3,516,815                          June 23, 1970

Emil P. Lira et al.

It is certified that error appears in the above identified patent and that said Letters Patent are hereby corrected as shown below:

Column 1, line 17, "p-methane" should read -- p-menthane --; line 21, "slightly" should read -- lightly --; line 48, "area" should read -- areas --; line 71, "treatment" should read -- treating --. Column 2, line 37, "p-methane" should read -- p-menthane --; line 46, "process" should read -- processes --. Column 3, line 38, "tetramthylthuram" should read -- tetramethylthuram --; line 72, "p-methane" should read -- p-menthane --. Column 4, line 1, "p-methane" should read -- p-menthane --; line 47, "monocarboxyic" should read -- monocarboxylic --. Column 5, line 25, "in" should read -- on --; line 34, "deedlings" should read -- seedlings --. Column 6, line 24, before "3%" insert -- about --.

Signed and sealed this 6th day of October 1970.

(SEAL)
Attest:

EDWARD M. FLETCHER, JR.
Attesting Officer

WILLIAM E. SCHUYLER, JR.
Commissioner of Patents